Oct. 26, 1943.  O. W. RICHARDS  2,332,668
COLONY COUNTING APPARATUS
Filed Feb. 19, 1941
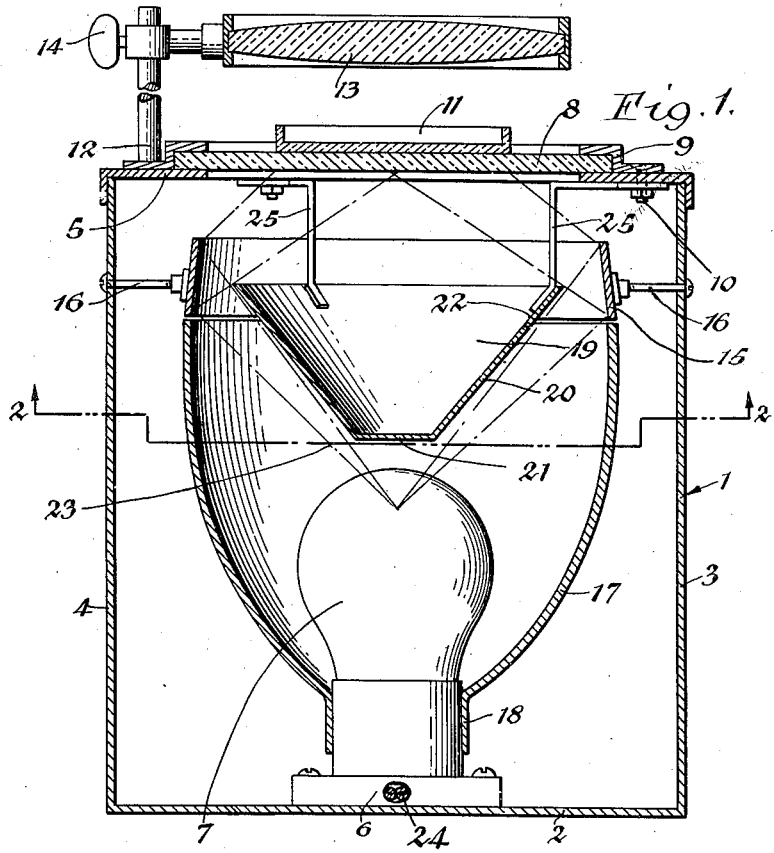
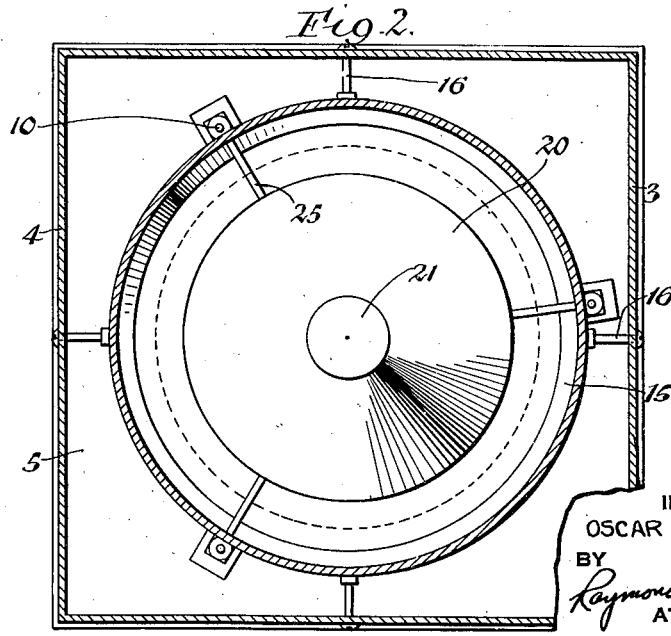
INVENTOR
OSCAR W. RICHARDS
BY
Raymond A. Paquin
ATTORNEY Patented Oct. 26, 1943

2,332,668

UNITED STATES PATENT OFFICE 2,332,668

COLONY COUNTING APPARATUS

Oscar W. Richards, Snyder, N. Y., assignor to Spencer Lens Company, Buffalo, N. Y., a corporation of New York Application February 19, 1941, Serial No. 379,698

4 Claims. (Cl. 88—40)

This invention relates to improvements in devices for viewing magnified objects and more particularly to an improved arrangement for illuminating the object to be examined.

One of the principal objects of the invention is to provide improved illuminating means for devices known as colony counters or the like.

Another object of the invention is to provide a simple, efficient and economical device for uniformly illuminating objects to be inspected under magnification.

Another object of the invention is to provide a new and improved device of the type set forth wherein the object to be viewed will be uniformly illuminated and will be viewed on a dark background.

Other objects and advantages of the invention will be apparent from the following description taken in connection with the accompanying drawing and it will be apparent that many changes may be made in the arrangement of parts and details of construction without departing from the spirit of the invention as expressed in the accompanying claims. I therefore do not wish to be limited to the exact details of construction and arrangement of parts shown and described as the preferred form has been shown by way of illustration only.

In the past colony counters have been illuminated in various ways. In some devices the illumination was from above and in others the illumination was from below. One of the difficulties with such devices has been that the illumination has not been uniform over the entire field to be viewed. Where the objects have been viewed on a bright background, the viewing has been difficult because it was harder for the eye to see the object against the bright background.

It is therefore one of the principal objects of the present invention to provide new and improved means for illuminating colony counters or the like which will uniformly illuminate the entire field to be examined and wherein the object being examined will be seen on a dark background and therefore be much more visible.

Referring to the drawing:

Fig. 1 is a sectional view of a device embodying the invention; and

Fig. 2 is a sectional view taken on line 2—2 of Fig. 1, looking in the direction of the arrows.

Referring more particularly to the drawing wherein similar reference characters designate corresponding parts throughout, the device comprises a casing 1 of metal or any other desired material, having the bottom wall 2, side walls 3 and 4 and the top wall 5.

Secured to the bottom wall 2 is the lamp socket 6 supporting the lamp 7, current for which is supplied through the wires 24 from the usual current supply. The top wall 5 of the casing has an opening therein over which is placed the transparent member 8 of glass or the like having rulings or graduations thereon to show regions of equal area. This member 8 is held therein by a circumferential flange member 9 which in turn is secured to the wall 5 by the bolts or the like 10.

On this transparent member 8 is placed the transparent container or Petri dish 11 containing the material to be examined.

The casing 1 is adapted to support the upright support 12 on which is pivotally mounted the magnifier 13. This magnifier is adjustably mounted on the support 12 so that it can be pivoted out of line of sight when desired and can be raised or lowered for desired adjustment or focusing and is adapted to be locked in said adjusted position by the set screw or the like 14.

Beneath the transparent plate 8 is the circular reflector 15 which is secured in position by the arms or brackets 16 which brackets are secured at one end to the top or a side wall of the casing 1 and to said reflector 15 at the other end. This reflector has its inner surface reflective.

Between the source of illumination 7 and the transparent plate 8 is positioned the cone member 19 supported by the arms 25. While three such arms 25 are shown, it will be obvious that the number should be as few as possible so as not to interfere with the light rays. This cone member has its outer surfaces 20 and 21 reflective and its inner surface non-reflective or black.

This cone member 19 may be of metal having its surfaces 20 and 21 nickel plated and its inner surface 22 painted black or may be of polished aluminum having its inner surface painted black or might be of silvered glass having its inner surface blackened or of alzac which is a polished aluminum and then having its inner surface painted black.

With such a device as the member 19 the object under inspection on the transparent plate 8 will be seen against the dark background of the black interior of said member 19 and yet because of the reflective surfaces 20 and 21 the light rays or the like 23 will be reflected, as shown in Fig. 1, onto the reflective surface of the reflector member 15 and then reflected by said member 15 through the transparent plate 8 and uniformly illuminate the object being examined. It will be seen that by employing this construction the object will be examined against the dark background but that due to the reflection of light the object itself will be uniformly illuminated, and because of this uniform illumination and dark background, smaller colonies of bacteria or the like are revealed which would not otherwise be seen, and also the device is easier on the eyes of the user.

While the cone member 19 has been described as conical in shape, it is to be understood that it is not necessary that this member be of such shape but that it may be made of any other desired form such as semi-circular or other desired form so long as it has a black inner face or interior and light reflective outer surfaces and is so formed and positioned as to reflect the light rays as described above and also form a dark background.

The device lends itself particularly well to the counting of bacterial colonies in cultures from milk or other fluids which are placed in the dish 11 and observed against the dark field through the magnifier 13 while the fluid in said dish 11 is illuminated by illumination from the light source 7 as described above.

If desired the device may also be provided with the parabolic reflector member 17 adapted to have the deflected end portions 18 fitting around the upper portion of the lamp socket 6 to hold said parabolic reflector 17 in position around the lamp. It is noted that while the use of such of parabolic reflector 17 will provide additional illumination, it is not essential that the instrument contain this element but it is particularly adaptable where additional illumination is desired.

From the foregoing it will be seen that I have provided simple, efficient and inexpensive means for carrying out the many advantages of the device and that in particular I have provided a new and improved device for inspecting or counting colonies of bacteria or the like wherein the entire field is uniformly illuminated and they are seen on a dark background.

Having described my invention, I claim:

1. In a device of the character described, comprising a casing having a source of illumination adjacent one end thereof and an opening adjacent the opposite end thereof, a circular reflector within said casing with the internal side surfaces of the walls of said circular reflector constituting reflective means, a hollow baffle supported internally of the casing having a solid wall portion disposed in the direction of the source of illumination and having side walls angularly disposed with respect to the solid wall and in spaced relation with the circular reflector, said hollow baffle member having a non reflective interior surface which interior surface is disposed in the direction of the opening in the casing, said baffle being located intermediate the source of illumination and the opening of the casing and having its upper end located below the upper end of said reflector to permit the major portion of light emanating from the source of illumination to impinge upon and be reflected by said reflector toward the opening in the casing for providing substantially even illumination over an area of said opening and means aligned with the opening in the casing for supporting specimens to be illuminated.

2. In a device of the character described, comprising a reflecting member having a source of illumination adjacent one end thereof and an opening adjacent the opposite end thereof, a circulator reflector, said reflector member and reflector having the internal side surfaces of their walls constituting reflective means, a hollow baffle supported internally of the reflecting member having a solid wall portion disposed in the direction of the source of illumination and having side walls angularly disposed with respect to and in spaced relation with the side walls of the reflecting member, said hollow baffle member having a non reflective interior surface which interior surface is disposed in the direction of the opening in the reflecting member and the solid wall of said baffle being located intermediate the source of illumination and the opening of the reflecting member and having its upper end located below the upper edge of the circular reflector to permit the major portion of light emanating from the source of illumination to impinge upon and be reflected by the side walls of the reflecting member toward the opening in the reflecting member and means aligned with the opening in the reflecting member for supporting a specimen to be illuminated, the internal reflective surface of the reflecting member being so angularly disposed relative to the light emanating from the source of illumination as to reflect the major portion of the light impinging thereon toward the opening in the reflecting member for providing substantially even illumination over an area of said opening.

3. In a device of the character described comprising a casing having a source of illumination adjacent one end thereof and an opening adjacent the opposite end thereof, a two part reflector within said casing with the internal side surface of the walls of said reflector constituting reflective means, said parts of said reflector having different radii, a hollow baffle supported internally of the casing having a solid wall portion disposed in the direction of and adjacent to the source of illumination and having side walls angularly disposed with respect to the solid wall and in spaced relation with the side walls of the casing, said baffle having its upper end located below the upper edge of the upper reflector, and said baffle member having a nonreflective interior surface and said baffle member being positioned to permit the major portion of light emanating from the source of illumination to impinge upon and be reflected by the two part reflector toward the opening in the casing for providing substantially even illumination over an area of said opening, and means aligned with the opening in the casing for supporting specimens to be illuminated.

4. In a device of the character described comprising a casing having a source of illumination adjacent one end thereof and an opening adjacent the opposite end thereof, a circular reflector within the casing with the internal side surface of the walls of said reflector constituting reflective means, a substantially conical hollow baffle supported internally of the casing having a solid wall portion disposed in the direction of and adjacent to the source of illumination and having said walls angularly disposed with respect to the solid wall and in spaced relation with the circular reflector, said hollow baffle member having a non reflective interior surface, said hollow baffle member having its upper end below the upper end of said circular reflector to permit the major portion of light emanating from the source of illumination to impinge upon and be reflected by said reflector toward the opening in the casing for providing substantially even illumination and means aligned with the opening in the casing for supporting specimens to be illuminated.

OSCAR W. RICHARDS.